Feb. 25, 1947.  C. ROEHRI  2,416,406
CONTROL MECHANISM FOR MOLDING PRESSES
Filed March 9, 1944  2 Sheets-Sheet 1

Inventor:
Carl Roehri
By:
Zabel, Carlson, Fitzhugh & Wells
Attorneys

Feb. 25, 1947.  C. ROEHRI  2,416,406
CONTROL MECHANISM FOR MOLDING PRESSES
Filed March 9, 1944  2 Sheets-Sheet 2
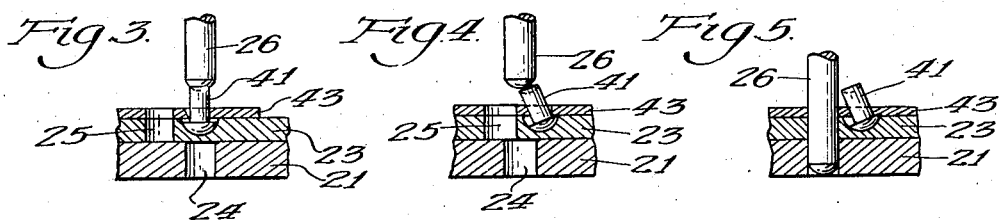
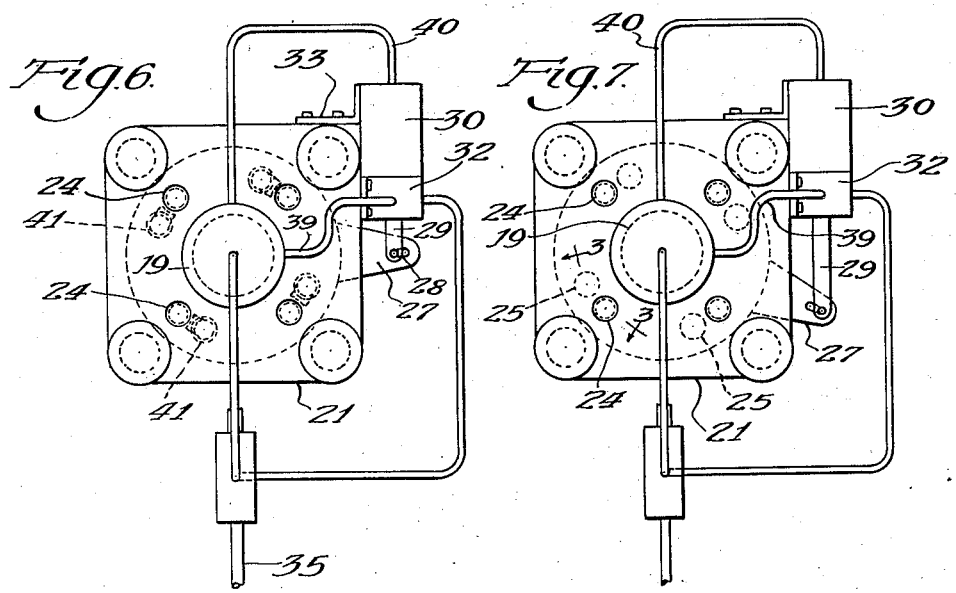
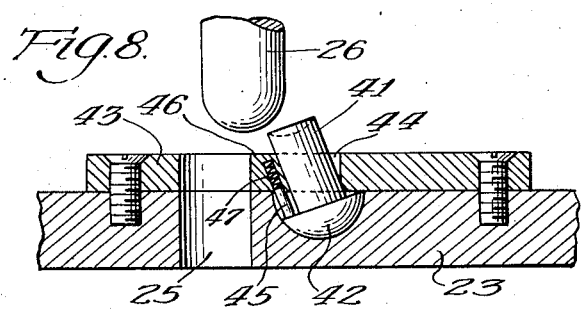
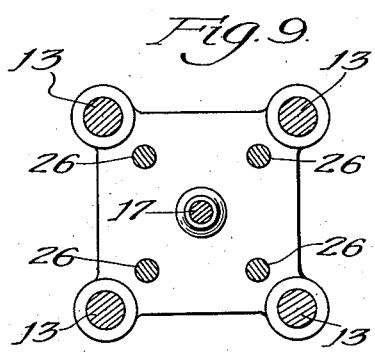
Inventor:
Carl Roehri
By:
Zabel, Carlson, Fritzbaugh & Wells
Attorneys Patented Feb. 25, 1947

2,416,406

UNITED STATES PATENT OFFICE 2,416,406

CONTROL MECHANISM FOR MOLDING PRESSES

Carl Roehri, Chicago, Ill.

Application March 9, 1944, Serial No. 525,655

11 Claims. (Cl. 18—16)

The present invention relates to control means for the actuation of injection molding presses and like mechanisms. The principal purpose of the invention is to provide a novel means for opening and closing the die members of a molding press wherein the die members are locked in closed position in such fashion as to free the operating mechanism therefor of all strains once the closing is completed. The locking mechanism is such as to automatically effect the locking and unlocking of a die member without additional travel necessary on the part of the opening and closing mechanism.

It is a further purpose of this invention to provide a novel locking means for locking die members in closed position.

The features and advantages of the present invention will appear more fully as the description proceeds, reference being had to the accompanying drawings wherein a preferred form of the invention is shown. It is to be understood however that the drawings and description are illustrative only and are not to be taken as limiting the invention except insofar as it is limited by the claims.

In the drawings:

Figs. 3, 4 and 5 are fragmentary sectional detail views taken on the line 3—3 of Fig. 7, illustrating the actuation of the locking means for the die members from locked position to unlocked position;

Fig. 6 is an end view looking at the lefthand end of Fig. 1 showing the parts in the same position as in Fig. 1;

Fig. 7 is an end view like Fig. 6 but showing the parts in the same position as in Fig. 2;

Fig. 8 is an enlarged fragmentary sectional view illustrating the details of the locking mechanism; and Fig. 9 is a sectional view taken on the line 9—9 of Fig. 2.

Figure 1:
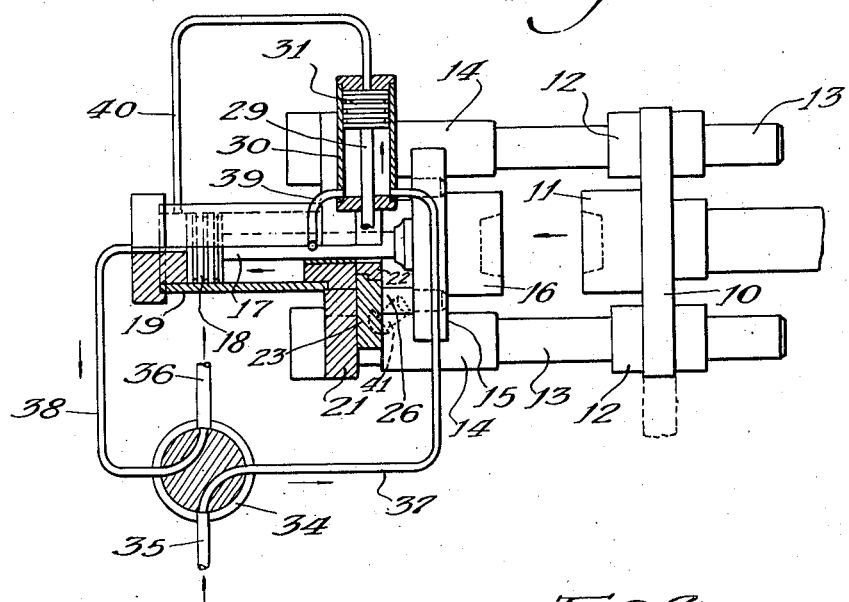
Fig. 1 is a view in side elevation with certain parts in section of an injection molding device embodying my invention.

Referring now in detail to the drawings, the present invention discloses my locking device in connection with an injection molding press wherein the press has a fixed mounting plate 10 carrying a fixed die member 11. The plate 10 carries four sleeves 12 which mount a plurality of guide bars 13. The guide bars receive a plurality of sleeve bearings 14 which support a plate 15 that serves to mount a movable die member 16. The plate 15 is connected to a piston rod 17 which is fixed to a piston 18 in a cylinder 19. The piston rod 17 extends through a bearing 20 at the base of the cylinder 19. The base of the cylinder 19 is a part of a fixed mounting plate 21 that is secured to the ends of the bars 13.

Figure 2:
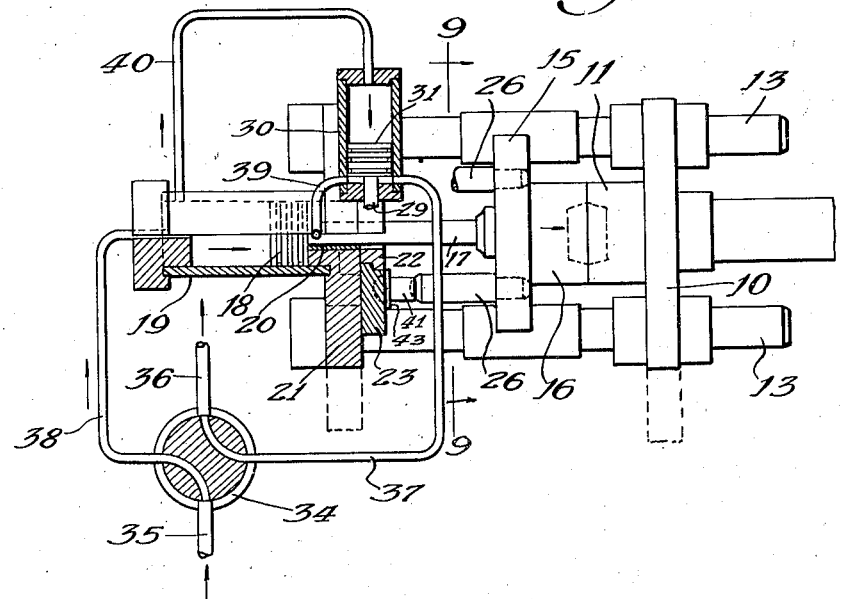
Fig. 2 is a view like Fig. 1 but showing a changed position of the parts.

On the plate 21 there is fixed an undercut ring 22 which is concentric with the piston rod 17 and which serves to rotatably mount a lock plate 23. The fixed mounting plate 21 has four holes 24 therein (see Fig. 6) and the locking plate 23 has a corresponding series of holes 25 of the same size as the holes 24. The openings 25 and 24 are adapted, when aligned with each other, to receive four locking pins 26 that are mounted on the plate 15. The pins 26 are of such length that when the die members are separated, as indicated in Fig. 1, by the piston 18 being forced to its extreme lefthand position the pins extend through the lock plate 23 and into the openings 24 of the mounting plate 21, but when the die members are both together, as shown in Fig. 2, the free ends of the pins 26 are spaced somewhat from the plate 23.

The plate 23 is connected by a lever arm 27 and a pin and slot connection 28 to the free end of a piston rod 29 that extends into a cylinder 30 where it is fixed to a piston 31. The cylinder 30 is mounted on the plate 21 by suitable brackets 32 and 33.

The means for supplying fluid under pressure to the cylinders 19 and 30 comprises a control valve 34 having an inlet 35 adapted to be connected to a suitable source of fluid under pressure and an outlet 36 for discharging spent fluid. A conduit 37 leads from the control valve 34 to the cylinder 30 and another conduit 38 leads from the control valve 34 to the cylinder 19. Two interconnecting conduits 39 and 40 connect the ends of the cylinders 19 and 30 so that fluid can pass from one cylinder to the other and thus both cylinders may be supplied with a fluid under pressure or emptied of the spent fluid by the two conduits leading to the valve. The valve is a fourway valve adapted to occupy the two positions shown in Figs. 1 and 2. In the position shown in Fig. 1 the conduit 37 is connected to the inlet 35 and the conduit 38 is connected to the outlet 36. In the position shown in Fig. 2 the conduit 38 is connected to the inlet 35 while the conduit 37 is connected to the outlet 36.

Referring now to Fig. 8, the means for locking the die members in closed position so that the pressure is taken directly by the plate 21 instead of by the piston 18 comprises a swiveled pin 41 cooperating with the locking pin 26. There are four of the swiveled pins 41 corresponding to the locking pins 26. Each swiveled pin has its head 42 seated in the lock plate 23. A small plate 43 is fastened to the lock plate 23 to cover the head of the pin 41 and allow just the shank of the pin to pass through an opening 44 in the plate 43. The pin 41 is normally biased to the position shown in Fig. 8 by a plunger 45 that is mounted in a recess 46 of the plate 43. A spring 47 in the recess 46 urges the plunger 45 outwardly against the head 42 of the pin 41 so as to tip it to the position shown in Fig. 8. The plate 43 is cut out as shown above the hole 35 in the plate 23.

In the operation of the injection molding press the parts are retracted into the position shown in Figs. 1 and 6. This is accomplished by pressure supplied from main pressure line 35 with the valve 34 manipulated into position as indicated in Fig. 1, thereby causing pressure to pass through the pressure line 37 into the cylinder 30 exerting force upon the piston 31 moving it into position as shown. This motion being transmitted through the piston rod 29 causes the lock plate 23 to turn on the lock plate bearing 22, thereby forcing the swiveled pins 41 out of engagement with the lock pins 26, as indicated in Fig. 5. Through continued holding of the valve 34 in the position shown in Fig. 1 additional pressure fluid is fed into the cylinder 30, but because the piston 29 is already in its end position this fluid will by-pass through the line 39 into the cylinder 19 causing the piston 18 to move to its end position as shown, thereby exerting force through the piston rod 17 upon the slide assembly plate 15 which is mounted by the bearings 14 and which carries the die member 16. Hydraulic fluid which was present in the cylinders 19 and 30 and in the pressure lines 38 and 40 has been forced through the valve 34 into the outlet 36. Meanwhile the clearance holes 24 in the stationary mounting plate 21 have been exposed by the rotation of the lock plate 23 through the clearance holes 25 in the latter to permit the lock pins 26 to move into the position shown in Figs. 1 and 5.

Figs. 2 and 7 show the press in a "closed" position with the mechanism locked. This is accomplished by pressure supplied from main pressure line 35 with the valve 34 manipulated into position as indicated in Fig. 2, thereby causing pressure to pass through the pressure line 38 into the cylinder 19 exerting force upon the piston 18 moving it from the position shown in Fig. 1 to that shown in Fig. 2. This moves the plate 15 and the die member 16 into the position shown in Fig. 2 where the die member 16 is in injection relationship with the die member 11 mounted on the stationary mounting plate 10. With the valve 34 in the position shown in Fig. 2, additional pressure fluid is fed through the pressure line 38 into the cylinder 19, but because the piston 18 is already in its end position this pressure fluid will by-pass through the pressure line 40 into the cylinder 30, causing the piston 31 to move down to the position shown in Fig. 2. This motion is transmitted through the piston rod 29 to the lock plate 23 causing it to turn and thereby forcing the pins 41 into engagement with the lock pins 26 as indicated in Fig. 3, the pins 41 being directed towards the engagement with the lock pins 26 by the spring pressed plungers 47. Hydraulic fluid which was present in the cylinders 19 and 30 and in the pressure lines 37 and 39 has been forced through the valve into the outlet.

The mechanism is now closed and locked and the material to be molded is injected into the die, after which the operation first described may be repeated by actuation of the valve 34. The actuation of the valve 34 may be accomplished manually or by a suitable coontrol mechanism.

From the foregoing description it is believed that the nature of the present invention and the advantages thereof will be clear to those skilled in this art.

Having thus described my invention, what I claim as new and desire to secure by Letters Patent is:

1. Actuating and locking mechanism for the movable die member of an injection molding press, comprising a mounting plate, a lock plate rotatably mounted thereon, a die carrier mounted to move perpendicular to the lock plate between a die closing position remote from the plates and a retracted position close to the plates, lock pins projecting toward the plates from said die carrier, said plates having holes therein for receiving the lock pins when the carrier is moved toward the plates, and said lock plate having swiveled pins thereon movable, by rotation of said lock plate and engagement with the ends of the lock pins, into axial alignment and endwise engagement with the lock pins when the die carrier is in its die closing position.

2. Actuating and locking mechanism for the movable die member of an injection molding press, comprising a mounting plate, a lock plate rotatably mounted thereon, a die carrier mounted to move perpendicular to the lock plate between a die closing position remote from the plates and a retracted position close to the plates, lock pins projecting toward the plates from said die carrier, and said lock plate having swiveled pins thereon movable, by rotation of said lock plate and engagement with the ends of the lock pins, into axial alignment and endwise engagement with the lock pins when the die carrier is in its die closing position.

3. Actuating and locking mechanism for the movable die member of an injection molding press, comprising a mounting plate, a lock plate rotatably mounted thereon, a die carrier mounted to move perpendicular to the lock plate between a die closing position remote from the plates and a retracted position close to the plates, lock pins projecting toward the plates from said die carrier, means to move said die member comprising a cylinder on the side of the mounting plate opposite the die carrier, a piston in said cylinder, and a piston rod projecting from the piston through the mounting plate and fixed to said die carrier, and said lock plate having swiveled pins thereon movable, by rotation of said lock plate and engagement with the ends of the lock pins, into axial alignment and endwise engagement with the lock pins when the die carrier is in its die closing position.

4. Actuating and locking mechanism for the movable die member of an injection molding press, comprising a mounting plate, a lock plate rotatably mounted thereon, a die carrier mounted to move perpendicular to the lock plate between a die closing position remote from the plates and a retracted position close to the plates, lock pins projecting toward the plates from said die carrier, means to move said die member comprising a cylinder on the side of the mounting plate opposite the die carrier, a piston in said cylinder, and a piston rod projecting from the piston through the mounting plate and fixed to said die carrier, said plates having holes therein for receiving the lock pins when the carrier is moved toward the plates, and said lock plate having swiveled pins thereon movable, by rotation of said lock plate and engagement with the ends of the lock pins, into axial alignment and endwise engagement with the lock pins when the die carrier is in its die closing position.

5. Actuating means for the movable die member of an injection molding press, comprising a cylinder, a piston therein connected to the movable die member and operable to move the die member from open to closed position and from closed to open position, lock pins fixed with respect to the die member, a second cylinder interconnected with the first named cylinder, a piston therein, valve means operable selectively to direct fluid under pressure to the opposite ends of said cylinders, a lock plate, means mounting said plate for movement in a plane perpendicular to the direction of movement of said die member, means connecting said lock plate to the piston of said second named cylinder, the lock plate and its mounting means having lock pin receiving holes therein aligned when the piston in said second named cylinder is in one limiting position, and said lock plate having tiltable projecting means thereon operable by return movement of the lock plate to engage the ends of the said lock pins after the piston of the first named cylinder advances the die member to closed position.

6. Actuating and locking mechanism for the movable die member of an injection molding press, comprising a mounting plate, a lock plate rotatably mounted thereon, a die carrier mounted to move perpendicular to the lock plate between a die closing position remote from the plates and a retracted position close to the plates, lock pins projecting toward the plates from said die carrier, means to move said die member and locking plate in timed relation, comprising two cylinders on said mounting plate, one of said cylinders having a piston therein connected with the die carrier, the other cylinder having a piston therein connected with the lock plate, pressure fluid connections to the ends of the two cylinders, and a valve operable to direct pressure fluid to either end of the cylinders and said lock plate having swiveled pins thereon movable, by rotation of said lock plate and engagement with the ends of the lock pins, into axial alignment and endwise engagement with the lock pins when the die carrier is in its die closing position.

7. Actuating and locking mechanism for the movable die member of an injection molding press, comprising a mounting plate, a lock plate rotatably mounted thereon, a die carrier mounted to move perpendicular to the lock plate between a die closing position remote from the plates and a retracted position close to the plates, lock pins projecting toward the plates from said die carrier, means to move said die member and locking plate in timed relation, comprising two cylinders on said mounting plate, one of said cylinders having a piston therein connected with the die carrier, the other cylinder having a piston therein connected with the lock plate, pressure fluid connections to the ends of the two cylinders, and a valve operable to direct pressure fluid to either end of the cylinders, said plates having holes therein for receiving the lock pins when the carrier is moved toward the plates, and said lock plate having swiveled pins thereon movable, by rotation of said lock plate and engagement with the ends of the lock pins, into axial alignment and endwise engagement with the lock pins when the die carrier is in its die closing position.

8. Combination actuating and locking means for movable die carriers utilizing fluid under pressure for movement of the die carrier and rigid means for holding the die carrier in load-receiving position, said means comprising a die carrier, means mounting the die carrier for reciprocatory movement between a retracted position and load-receiving position, lock pins projecting from said carrier in the direction of retractive movement, a mounting plate having holes therein adapted to receive the lock pins when the die carrier is moved to retracted position, a piston rod fixed to the die carrier, a piston thereon, a cylinder for said piston having a pressure fluid receiving and exhausting inlet at each end, a lock plate journaled for rotation on the mounting plate in a plane perpendicular to the direction of movement of the die carrier, said locking plate having lock pin holes adapted in one limiting position of the plate to align with the lock pin holes in the mounting plate, a piston rod operatively connected to the lock plate to effect rotative movement thereof between two limiting positions, a piston on said rod, a cylinder for the piston having a fluid pressure receiving and exhausting inlet at each end, and projecting lock means on said lock plate normally inclined to the axis of said pins and movable, upon rotation of the lock plate from the position where the holes therein align with those in the mounting plate to its other limiting position, into aligned endwise abutting relationship with said lock pins whereby to back up the die carrier in load receiving position, the end of the first named cylinder to which fluid enters to advance the die carrier to load-receiving position being connected by a conduit to the end of the other cylinder to which fluid enters to turn the lock plate to the position where its lock means is in endwise abutting relationship with the lock pins, and a conduit interconnecting the opposite ends of said cylinders.

9. Actuating and locking mechanism for the movable die member of an injection molding press, comprising a mounting member, a carrier for the movable die, means fixed to said mounting member for guiding the die carrier in a straight line toward and away from the mounting member, a lock plate mounted for movement perpendicular to the movement of the die carrier, lock pins projecting toward the lock plate from said die carrier, said lock plate having swivel pins thereon movable by movement of said lock plate into engagement with the ends of the lock pins on the die carrier, said lock plate being movable further upon engagement of the swivel pins with the ends of the lock pins to axially align the swivel pins and lock pins when the die carrier is in its die closing position.

10. Actuating and locking mechanism for the movable die member of an injection molding press, comprising a mounting member, a carrier for the movable die, means fixed to said mounting member for guiding the die carrier in a straight line toward and away from the mounting member, a lock plate mounted for movement in a plane perpendicular to the direction of movement of said die carrier between two alternative positions, lock pins projecting toward the lock plate from said die carrier, and means on said plate movable into engagement with the ends of said lock pins upon movement of said plate from one of said alternative positions toward the other alternative position thereof and movable from an angular position relative to said pins into axial alignment therewith upon completion of movement of said plate into said other position.

11. Actuating and locking mechanism for the movable die member of an injection molding press, comprising a mounting plate, a lock plate rotatably mounted thereon, a die carrier mounted to move in a direction perpendicular to the lock plate between a die closing position remote from the plates and a retracted position close to the plates, lock pins projecting toward the plates from said die carrier, means to move said die member and locking plate in timed relation, comprising two cylinders on said mounting plate, one of said cylinders having a piston therein connected with the die carrier, the other cylinder having a piston therein connected with the lock plate, a pressure fluid supply line, a control valve having two alternative positions, and pressure fluid conduits extending between said valve and one end of each of said cylinders a conduit extending from each of said cylinders to the end of the other cylinder opposite that to which the conduit from said valve extends and to supply pressure fluid from said supply line directly to said die carrier cylinder and from said die carrier cylinder to said lock plate cylinder for one position of said valve and from said supply line directly to said lock plate cylinder and from said lock plate cylinder to said die carrier cylinder for the other position of said valve.

CARL ROEHRI.

REFERENCES CITED

The following references are of record in the file of this patent:

UNITED STATES PATENTS

| Number | Name | Date |
|---|---|---|
| 1,466,490 | Swenson | Aug. 28, 1923 |
| 2,268,949 | Lehmann | Jan. 6, 1942 |

Certificate of Correction

Patent No. 2,416,406. February 25, 1947.

CARL ROEHRI

It is hereby certified that error appears in the printed specification of the above numbered patent requiring correction as follows: Column 8, line 3, claim 11, after the word "extends" strike out "and" and insert the same in column 7, line 21, same claim, after "cylinders"; and that the said Letters Patent should be read with this correction therein that the same may conform to the record of the case in the Patent Office.

Signed and sealed this 6th day of May, A. D. 1947.

[SEAL]

LESLIE FRAZER,
*First Assistant Commissioner of Patents.*